Feb. 7, 1950  KUAN-HAN SUN ET AL  2,496,824
FERRIC FLUOPHOSPHATE GLASS
Filed Aug. 9, 1946
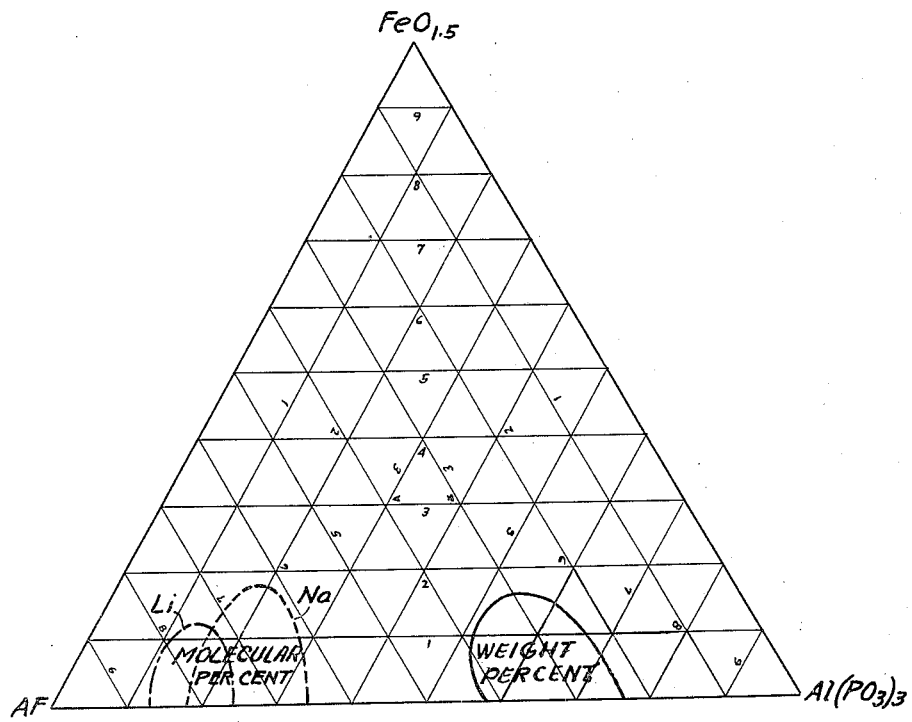
KUAN-HAN SUN
THOMAS E. CALLEAR
INVENTORS
ATTORNEY Patented Feb. 7, 1950

2,496,824

UNITED STATES PATENT OFFICE 2,496,824

FERRIC FLUOPHOSPHATE GLASS

Kuan-Han Sun and Thomas E. Callear, Rochester, N. Y., assignors to Eastman Kodak Company, Rochester, N. Y., a corporation of New Jersey Application August 9, 1946, Serial No. 689,533

2 Claims. (Cl. 106—47)

This invention relates to fluophosphate glasses and in particular to such glasses containing ferric iron. It is well known that iron, both in ferrous and in ferric states, introduces severe coloration into glass. Glasses containing only a few per cent of iron are usually very dark in color. It is also known that ferric phosphate is colorless and that colored aqueous solutions containing iron can be decolorized by addition of phosphates and fluorides.

We have found that these qualities can be utilized in a fluophosphate glass with a high ferric iron content with relatively light color. With very pure materials and under carefully controlled conditions a state of colorlessness is approached. Such glasses are also found to have most unusually high blue partial dispersions as compared to previously known glasses of similar Abbé value.

A general formula convenient for consideration may be given as $AF—FeO_{1.5}—AlO_{1.5}—PO_{2.5}$ in which AF represents fluoride of lithium, or sodium or a mixture of them. It is to be noted in passing that while a glass results when potassium fluoride is used, it is soft and has little resistance to weathering and we do not include such a glass in our invention. For general practice, $Al(PO_3)_3$ is commonly used for the aluminum and phosphorous oxides.

The amount of sodium fluoride may be between 22 to 40 per cent by weight, or 62 to 82 mole per cent; of lithium fluoride, 22 to 40 per cent by weight or 62 to 82 mole per cent; of ferric oxide, 2 to 15 per cent by weight or 3 to 16 mole per cent; of aluminum metaphosphate, 55 to 76 per cent by weight or 11 to 32 mole per cent; depending in part on which fluoride is used.

The atomic or ionic ratio of fluorine to phosphorus (F/P) in the glass is less than 2.5. It has been found that a ternary diagram of the weight per cents of the system $AF—FeO_{1.5}—Al(PO_3)_3$ is very nearly the same for LiF— and NaF— systems. In the accompanying figure is shown a ternary diagram, the full line at the right approximating the boundaries of the region of glass formation in weight per cent. The precise position of such a line varies with experimental conditions. The broken lines designated Na, and Li indicate the approximate boundaries of the region of glass formation in mole per cent where sodium, and lithium respectively are the alkalis used.

It is interesting to note that as much as about 15 per cent (either weight or molecular) of ferric oxide can be introduced into these glasses and that the resulting glasses, while somewhat colored, are clear and transparent.

The following table gives three examples of the glasses embodying the principles of our invention. In these particular examples sodium fluoride was used. For each ingredient the weight and mole per cents are given under the letters W and M respectively. The optical properties, the refractive index for the D line ($n_D$), the Abbé value ($\nu$) and the blue partial dispersion ratio ($\nu gF$) and the atomic ratio F/P are also given. It is to be noted that the blue partial dispersion ratio is unusually high.

|  | 1 | | 2 | | 3 | |
|---|---|---|---|---|---|---|
|  | W | M | W | M | W | M |
| NaF | 30 | 67.0 | 36 | 73.9 | 27 | 65.6 |
| $FeO_{1.5}$ | 10 | 11.7 | 7 | 7.5 | 7 | 8.9 |
| $Al(PO_3)_3$ | 60 | 21.3 | 57 | 18.6 | 66 | 25.5 |
| $n_D$ | 1.5336 | | 1.4893 | | 1.5192 | |
| $\nu$ | 42.7 | | 50.3 | | 50.0 | |
| $\nu gF$ | 0.610 | | 0.594 | | 0.592 | |
| F/P | 1.05 | | 1.33 | | 0.86 | |

In making these glasses, the materials are taken in dry powdered form. As is usual in glass making the materials are not necessarily introduced in the form given above to which they are transformed in the batch. The iron may be introduced as ferric oxide or ferric phosphate. It is further to be understood that the glass is presumably a conglomerate in which the positive and negative ions are variously grouped.

The powdered material may be all melted together or the fluorides and aluminum phosphate may first be melted to a liquid and then ferric oxide added. The latter method is preferred as it appears to yield glass of lighter color. A covered platinum vessel is used, the cover being important to minimize volatilization. The melting temperature is about 1000–1100° C. At these temperatures the glass is rather fluid while the volatilization is not severe. For a 50-gram batch, the melting of fluoride and aluminum phosphate takes about ten minutes. A uniform liquid results after the addition of ferric oxide and a few minutes more heating. The glass may be shaken at room temperature to a viscous liquid and poured into a mold previously heated to about 300–450° C.

It is to be understood that other ingredients common in glass making may be added in small amounts to a glass predominantly of the composition disclosed herein.

While, as indicated in the figures, glass is formed even though no iron is present, we do not consider as within our invention a glass in which the percentage of iron is less than two per cent, either by weight or mole.

By using aluminum and phosphorous oxides in varying proportions, or mixtures of aluminum oxide and aluminum phosphate, ratios of these two components other than that of the metaphosphate may be obtained and we consider glasses so formed within the scope of our invention.

Since $Fe_2O_3$, $Al_2O_3$, etc., are empirical formulas, it is equally expedient and more convenient, particularly in using cationic percentages, to adopt the form $FeO_{1.5}$, $AlO_{1.5}$, etc.

Having thus described our invention, what we claim is:

1. An optical glass resulting from fusion of a batch comprising essentially in weight per cent, fluoride chosen from the group consisting of the fluorides of lithium and sodium, 22 to 40; ferric oxide, 2 to 15; aluminum metaphosphate, 55 to 76.

2. An optical glass resulting from fusion of a batch comprising essentially sodium fluoride, 62 to 82 mole per cent; ferric oxide, 3 to 16 mole per cent; aluminum metaphosphate, 17 to 32 mole per cent.

KUAN-HAN SUN.
THOMAS E. CALLEAR.

REFERENCES CITED

The following references are of record in the file of this patent:

UNITED STATES PATENTS

| Number | Name | Date |
|---|---|---|
| 2,278,501 | Tillyer et al. | Apr. 7, 1942 |
| 2,359,789 | Pincus | Oct. 10, 1944 |